G. AMBORN.
CHAIN PIPE WRENCH.
APPLICATION FILED APR. 21, 1910.
1,014,931.
Patented Jan. 16, 1912.
5 SHEETS—SHEET 1.
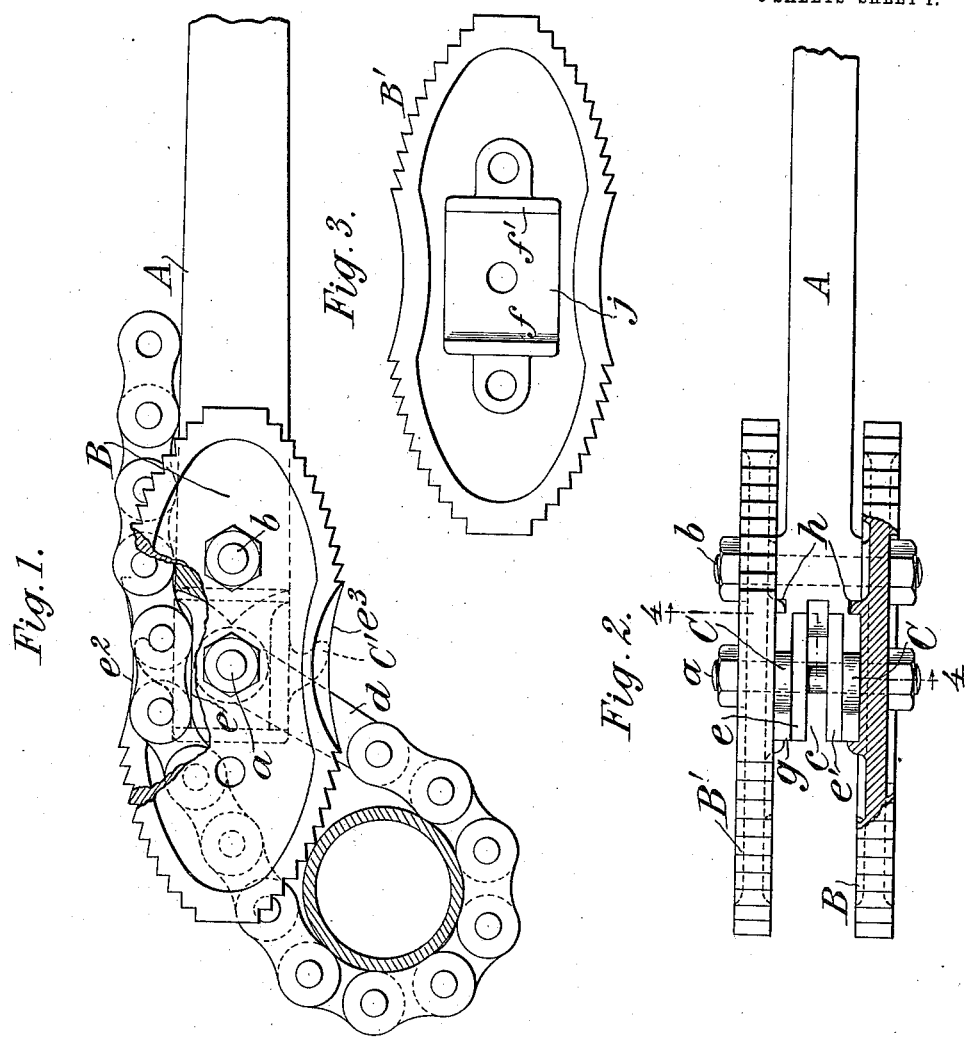
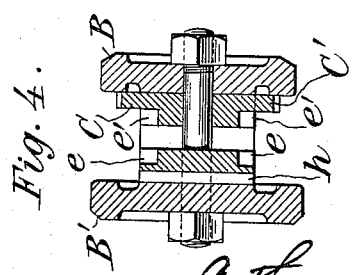
WITNESSES:
Fred White
René Bruine
INVENTOR:
George Amborn,
By Attorneys, G. AMBORN.
CHAIN PIPE WRENCH.
APPLICATION FILED APR. 21, 1910.
1,014,931.
Patented Jan. 16, 1912.
5 SHEETS—SHEET 2.
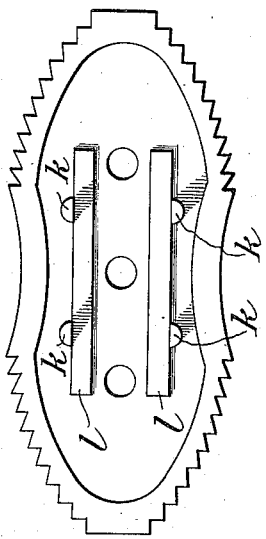
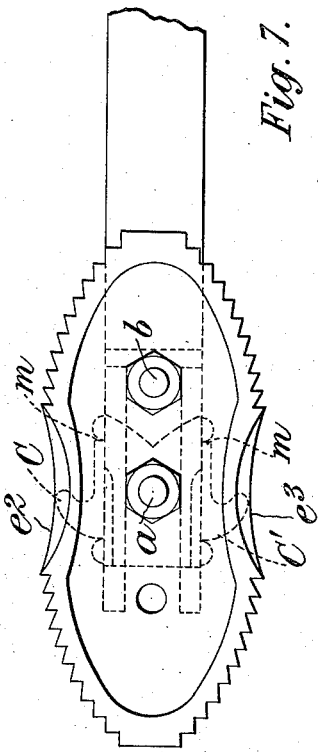
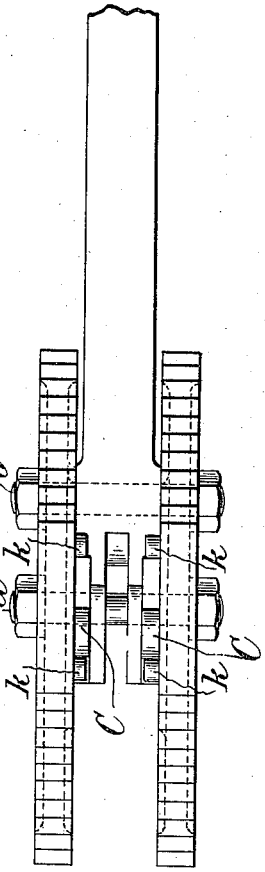
WITNESSES:
INVENTOR:
George Amborn,
By Attorneys, G. AMBORN.
CHAIN PIPE WRENCH.
APPLICATION FILED APR. 21, 1910.
1,014,931.
Patented Jan. 16, 1912.
5 SHEETS—SHEET 3.
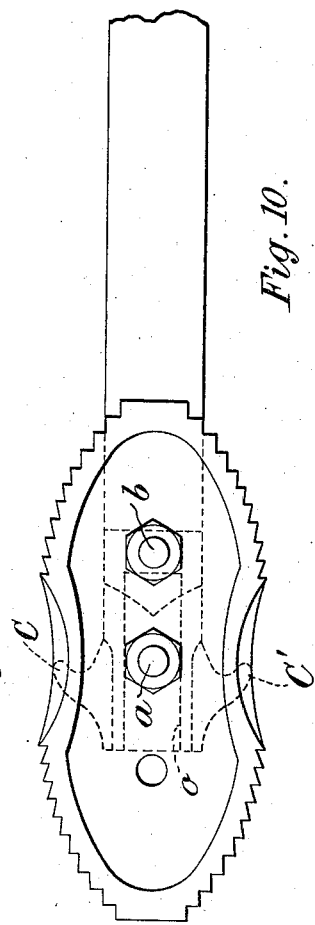
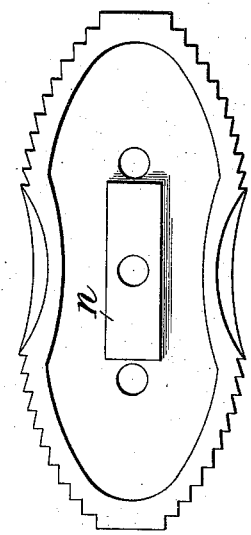
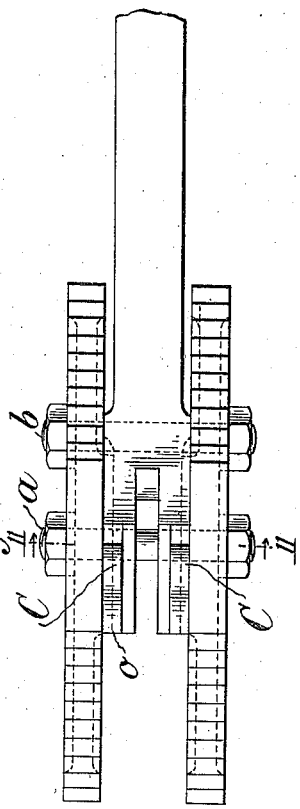
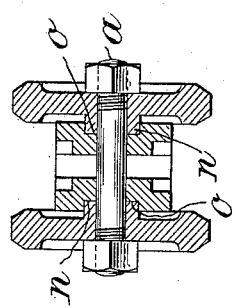
WITNESSES:
Fred White
René Bruine
INVENTOR:
George Amborn,
By Attorneys,
Arthur C. Fraser & Usina G. AMBORN.
CHAIN PIPE WRENCH.
APPLICATION FILED APR. 21, 1910.
1,014,931.
Patented Jan. 16, 1912.
5 SHEETS—SHEET 4.
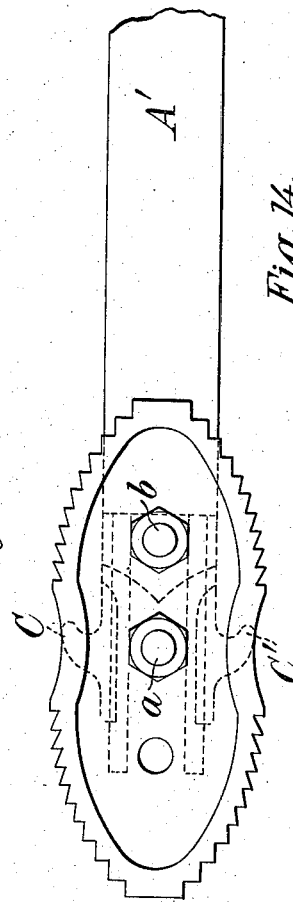
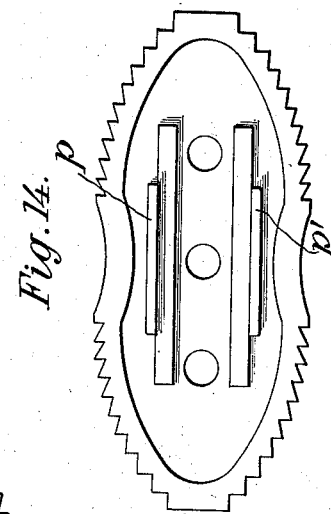
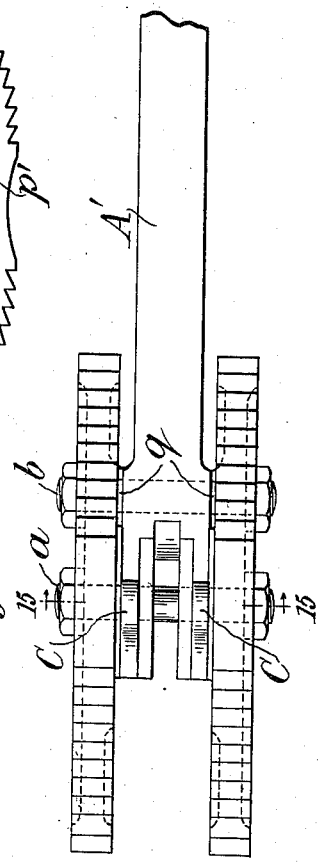
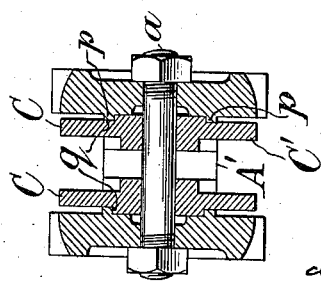
WITNESSES:
INVENTOR:
George Amborn,
By Attorneys,

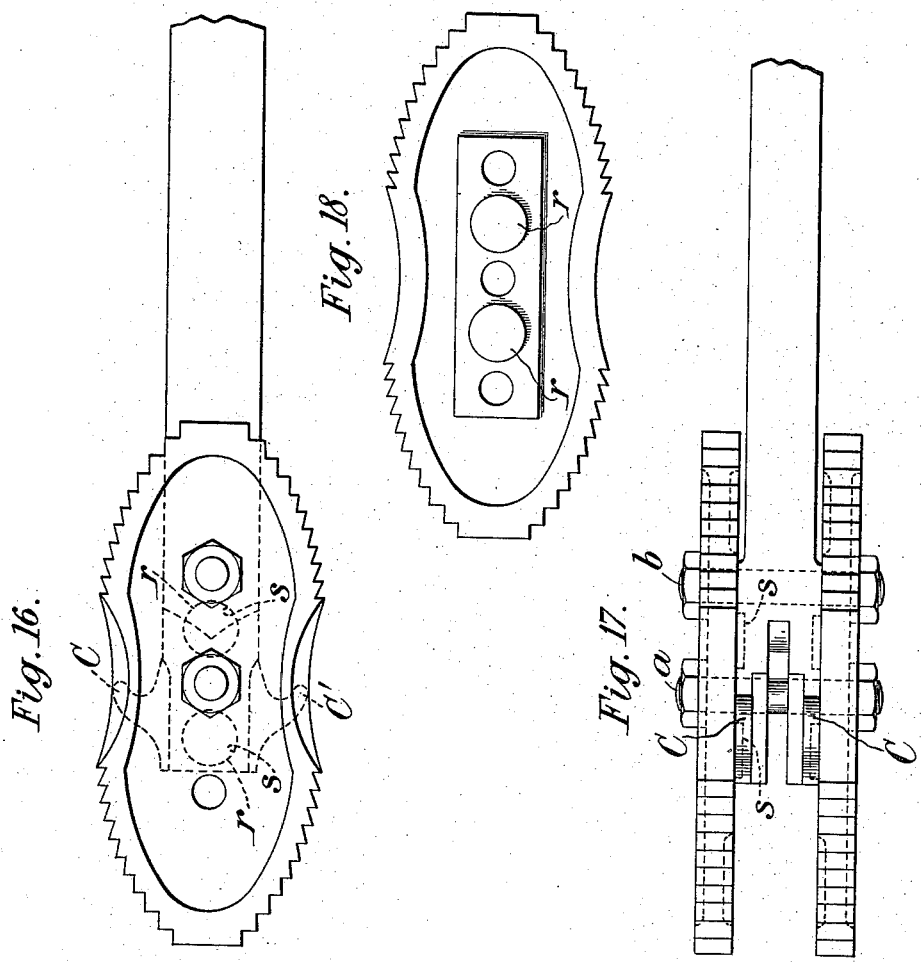

UNITED STATES PATENT OFFICE.

GEORGE AMBORN, OF NEW YORK, N. Y., ASSIGNOR TO J. H. WILLIAMS & CO., OF BROOKLYN, NEW YORK, A CORPORATION OF NEW YORK.

CHAIN PIPE-WRENCH.

1,014,931.  Specification of Letters Patent.  Patented Jan. 16, 1912.

Application filed April 21, 1910. Serial No. 556,726.

*To all whom it may concern:*

Be it known that I, GEORGE AMBORN, a citizen of the United States, residing in the borough of Brooklyn, county of Kings, city and State of New York, have invented certain new and useful Improvements in Chain Pipe-Wrenches, of which the following is a specification.

This invention relates to chain pipe wrenches and aims to provide certain improvements therein.

The invention is especially directed to wrenches having double-ended, reversible jaws of the type set forth in Patent No. 952,860, granted March 22, 1910, wherein a lock is provided for locking the chain in both the normal and reverse positions of the jaws, such lock being located upon the handle so that it retains its position irrespective of the positions of the jaws.

According to the present invention I provide a wrench of this type in which the locks are preferably located at the end of the handle, and in which a secure inter-engagement between the jaws and handle is provided.

In the drawings wherein I have shown several embodiments of the invention, Figure 1 is a side elevation partly in section of one form of the invention; Fig. 2 is a plan of the wrench with the chain removed, a part of one jaw being shown in section; Fig. 3 is a view of the inner face of one of the jaws; Fig. 4 is a cross-section on the line 4—4 of Fig. 2. Fig. 5 is an elevation of another embodiment of the invention. Fig. 6 is a plan of Fig. 5. Fig. 7 is a view of the inner face of one of the jaws of Fig. 5. Fig. 8 is a side elevation of another embodiment. Fig. 9 is a plan of Fig. 8. Fig. 10 is a view of the inner face of one of the jaws of Fig. 8. Fig. 11 is a section on the line 11—11 of Fig. 9. Fig. 12 is a side elevation of another embodiment of the invention. Fig. 13 is a plan of Fig. 12. Fig. 14 is a view of the inner side of one of the jaws of Fig. 12. Fig. 15 is a section on the line 15—15 of Fig. 13. Fig. 16 is a side elevation of another embodiment of the invention. Fig. 17 is a plan of Fig. 16. Fig. 18 is a view of the inner face of one of the jaws of Fig. 16.

Referring first to Figs. 1 to 4, let A indicate a suitable handle or shank which has bolted to it at its forward end two jaws B and B'. The jaws B and B' are double-ended, that is to say, there are working faces formed on both ends of the jaws. The jaws are bolted to the handle by means of bolts $a$, $b$, the bolt $a$, being centrally located, while the bolt $b$, is arranged at the rear of the bolt $a$. The handle is slotted at its forward end at $c$ to receive the first link $d$ of the chain, which is pivoted to the wrench by the bolt $a$, this construction permitting the chain to be used on either side of the wrench.

According to the present invention the locks for engaging the chain are formed preferably upon the upper and lower faces of the handle, and are preferably located at the front part of the latter, so that they lie approximately in the same vertical plane (when the wrench is horizontal, as shown in Fig. 1) as the bolt $a$. When the locks are so located, the chain may be of somewhat shorter construction and the wrench proportionately cheaper and lighter than would be the case if the locks were located farther back upon the handle. In placing the locks at the point indicated, however, they must be so low as not to project above the usual concave faces $e^3$ of the jaws. In order to accomplish this my present invention provides certain constructions in which the interengaging faces between the jaws and handle are so constructed that locks of proper size may be used without increasing the width of the jaws. If the latter were increased in width it would be necessary to increase their length in order to obtain efficiency in use. My invention also provides a weight of metal at the forward end of the handle which increases its strength at this point, while at the same time the two points of engagement of the chain with the wrench are close together. The locks, which are shown at C C' are preferably formed as hooks, the recesses of which face rearwardly, and are forged upon the handle at the upper and lower sides of the bifurcated end of the latter. Preferably the handle has recesses $e$ $e'$ on its upper and lower sides which are designed to receive the edge of the links of the chain.

According to the invention in its preferred form the inter-engaging provisions between the jaws and handle are located so that they do not extend beyond the upper or lower face of the handle. When the jaws are provided with ribs which extend beyond such upper and lower faces, the locks must be formed proportionately higher, especially when the locks are located at that part of the handle which inter-engages with the jaws. With the present construction, however, they can be brought closely together with no increase in size of the jaws.

In the construction of Figs. 1 to 4 the jaws are each provided with two vertical ribs $f$ $f'$, one of which is adapted to closely contact with the end face $g$ of the handle, and the other of which is adapted to enter a vertical groove $h$ formed in the handle at each side thereof. One of such ribs hence lies in the front of the locks and the other at the rear of the same. Between the ribs $f$ $f'$ I preferably provide a flat surface $j$ which is designed to contact with the side walls of the end of the handle. This surface and the ribs $f$ $f'$ can be very easily and quickly machined from the rough forgings, while the slots $h$ in the handle may also be cheaply cut in a suitable milling machine. In the construction thus described the strains of use are taken up most effectively, and the connection between the handle and jaws is strong and durable. When the jaws are to be reversed the nut of the bolt $a$ is loosened and the nut of the bolt $b$ is removed, and the latter withdrawn, whereupon the jaws can be turned end for end and the bolt $b$ replaced. As the locks are not reversed with the jaws, they act to lock the chain in either the normal or reversed positions of the jaws.

In Figs. 5, 6 and 7 I have shown a modified construction of interengaging means between the handle and the jaws. In this construction four lugs $k$ are formed on the inner face of each jaw, such lugs being adapted to engage the upper and lower faces of the handle. Preferably raised bearing faces $l$ $l$ are provided which engage the sides of the handle. In this construction the two forward lugs $k$ $k$ abut closely against the forward face of the locks C C', while the two rear lugs abut against shoulders $m$ formed at the rear of the locks. By this means the lugs oppose not only lateral movement of the handle with relation to the jaws, but also longitudinal movement thereof. In this construction, the interengaging means being at the ends of the locks, the width of the jaws need not be increased by the location of the locks but by the curved faces $e^2$ $e^3$.

In Figs. 8 to 11 I have illustrated another modification in which the jaws are formed on their inner sides with substantially rectangular ribs $n$ while the handle is formed with corresponding longitudinal slots $o$ on its sides which are designed to receive the ribs $n$.

In Figs. 12 to 15 the jaws are formed with narrow ribs $p$ $p$ between which the sides of the handle are adapted to fit. The latter is provided at its corners with grooves or recesses $q$ adapted to receive the ribs $p$ and for convenience of manufacture these grooves are continued through the enlarged end of the handle as shown in Fig. 13, the shank A' in this case being of somewhat less width beyond the point of connection with the jaws. The locks C C' are as before formed on the upper and lower faces of the handle, but they abut laterally against the inner sides of the jaws, being spaced apart from them a distance approximately equal to the thickness of the ribs $p$ as shown in Fig. 15.

In Figs. 16 to 18 the jaws are formed with circular lugs $r$ $r$ while the handle is formed with corresponding recesses $s$ $s$. Such lugs and recesses are arranged equi-distantly from the central bolt hole so that they interengage in both the normal and reversed positions of the jaws.

It will be seen that my invention provides an extremely efficient, strong and durable construction of chain pipe wrench in which the locks are arranged in their foremost positions so that a shorter chain can be used, without enlarging the jaws, and in which the same locks serve in both the normal and reversed positions of the jaws. While I have shown several modifications of the invention, it will be understood that other changes may be made without departing from the invention. The invention is also applicable to chain pipe vises and other similar tools.

What I claim is:—

1. In a chain pipe wrench or the like, the combination of a pair of double-ended reversible jaws, a handle, a central bolt for connecting said handle and jaws, a chain pivoted at one end upon said central bolt, and a lock integrally formed on an outer face of said handle transversely opposite said central bolt, and interengaging provisions between said handle and jaw on each side of the handle, said interengaging provisions constituting a pair of projections and complementary sockets and permitting a flush engagement of the sides of said handle and jaws, said projections being upon opposite sides of said central bolt.

2. In a chain pipe wrench or the like, the combination of a pair of double-ended reversible jaws, a handle, a central bolt for connecting said handle and jaws, a chain pivoted at one end upon said central bolt, and a pair of locks integrally formed in an outer face of said handle transversely opposite said central bolt and opposite one another, and interengaging provisions between said handle and jaw on each side of the handle said interengaging provisions constituting a pair of projections and complementary sockets and permitting a flush engagement of the sides of said handle and jaws, said projections being upon opposite sides of said central bolt.

3. In a chain pipe wrench or the like, the combination of a pair of double-ended reversible jaws, a handle, a central bolt for connecting said handle and jaws, a chain pivoted at one end upon said central bolt, and a lock integrally formed on an outer face of said handle transversely opposite said central bolt, and interengaging provisions between said handle and jaw, on each side of the handle said interengaging provisions constituting a pair of ribs formed upon the inner face of each of the jaws, and slots in said handle adapted to receive said ribs, whereby the faces of said handle are flush with those of said jaws.

4. In a chain pipe wrench or the like, the combination of a pair of double-ended reversible jaws, a handle having a bifurcated end, a central bolt for connecting said handle and jaws, a chain pivoted at one end upon said central bolt, a lock integrally formed on an outer face of said handle transversely opposite said central bolt, and interengaging provisions between said handle and jaw, on each side of the handle said interengaging provisions constituting a pair of ribs formed upon the inner face of each of the jaws and extending laterally of the handle, slots on the inner sides of said handle, one of the ribs on each of the jaws being adapted to fit within a slot on one side of the handle, and the other rib on each jaw being adapted to fit against the end of the handle whereby the faces of said handle are flush with those of said jaws, said ribs being on opposite sides of the central bolt.

5. In a chain pipe wrench or the like, the combination of a pair of double-ended reversible jaws, a handle, having a bifurcated end, a central bolt for connecting said handle and jaws, a chain pivoted at one end upon said central bolt, and a lock integrally formed on an outer face of said handle transversely opposite said central bolt, and interengaging provisions between said handle and jaw on each side of the handle said interengaging provisions constituting a pair of ribs formed upon the inner face of each of the jaws and extending laterally of the handle, slots on the inner sides of said handle, above said bifurcations, one of the ribs on each of the jaws being adapted to fit within a slot on one side of the handle, and the other rib on each jaw being adapted to fit against the end of the handle whereby the faces of said handle are flush with those of said jaws, said ribs being on opposite sides of the central bolt.

6. In a chain pipe wrench or the like, the combination of a pair of double ended reversible jaws, a handle slotted at its forward end, means located approximately centrally of the jaws for pivoting the chain in the slot in the end of said handle, interengaging projections and recesses between said handle and jaws permitting a flush engagement of the sides of said handle and jaws, locking lugs for the chain formed on one of the upper or lower sides of said handle, said lugs being adapted for use in either the normal or reversed positions of said jaws, and being located within the width of the jaws whereby they are protected by the jaws.

7. In a chain pipe wrench or the like, the combination of a pair of double ended reversible jaws, a handle slotted at its forward end, means located approximately centrally of the jaws for pivoting the chain on the slot in the end of said handle, interengaging projections and recesses between said handle and jaws permitting a flush engagement of the sides of said handle and jaws, locking lugs for the chain formed on one of the upper or lower sides of said handle, said lugs being arranged transversely substantially in line with the said pivoting means and adapted for use either in the normal or reversed positions of said jaws, and being located within the width of the jaws whereby they are protected by the jaws.

8. In a chain pipe wrench or the like, the combination of a pair of double-ended reversible jaws, a handle, a central bolt for connecting said handle and jaws, a chain pivoted at one end upon said central bolt, and a lock integrally formed on an outer face of said handle transversely opposite said central bolt, and interengaging provisions between said handle and jaw on each side of the handle, said interengaging provisions permitting a flush engagement of the sides of said handle and jaws.

In witness whereof, I have hereunto signed my name in the presence of two subscribing witnesses.

GEORGE AMBORN.

Witnesses:
EUGENE G. MYERS,
FRED WHITE.